（12）United States Patent
Nakajima et al.

(10) Patent No.: US 8,489,325 B2
(45) Date of Patent: Jul. 16, 2013

(54) POINT OF INTEREST BASED DIRECTIONS IN A MAPPING APPLICATION

(75) Inventors: Taido Nakajima, Cupertino, CA (US); Tyler Mincey, Pacifica, CA (US); Gloria Lin, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 12/689,732

(22) Filed: Jan. 19, 2010

(65) Prior Publication Data

US 2011/0178697 A1    Jul. 21, 2011

(51) Int. Cl.
*G08G 1/123* (2006.01)
(52) U.S. Cl.
USPC .......................................... 701/426; 701/438
(58) Field of Classification Search
USPC ...... 701/408, 410, 426, 438, 400; 273/127 R, 273/121 A, 119 A, 118 D, 118 A, 127 B
See application file for complete search history.

(56) References Cited

U.S. PATENT DOCUMENTS

| 6,823,257 | B2 | 11/2004 | Clapper |
| 2004/0220730 | A1 | 11/2004 | Chen et al. |
| 2005/0049785 | A1 | 3/2005 | Vergin |
| 2006/0259238 | A1 | 11/2006 | Jung et al. |
| 2009/0082960 | A1* | 3/2009 | Ramaswamy et al. ........ 701/211 |
| 2011/0050732 | A1* | 3/2011 | Arrasvuori .................... 345/666 |

* cited by examiner

*Primary Examiner* — Thomas Black
*Assistant Examiner* — Luke Huynh
(74) *Attorney, Agent, or Firm* — Kilpatrick Townsend & Stockton LLP

(57) ABSTRACT

Systems and methods are provided for defining a route from a starting point to a destination. The route can include several steps, each including an instruction directing a user to move in a particular manner, and a reference around or near which to follow the instruction. To assist the user in following the directions, a step can include one or more points of interest serving as references. In particular, points of interest having high visibility (e.g., relative to street signs) can be selected to serve as references for the directions. The device can select which points of interest to use based on any suitable criteria, including for example based on the distance of a point of interest from a location where a step requires an instruction, as well as based on visibility attributes of the points of interest.

18 Claims, 9 Drawing Sheets

Driving directions to Safeway — 600

45.6 mi - about 48 mins (up to 1 hour 10 mins in traffic)

(A) San Francisco, CA — 614, 624

1. Head northeast on Market St. toward Gas Station — 52 ft — 626

2. Turn right at S Van Ness Ave, 1st light — 0.4 mi — 610

3. Slight right to merge onto US-101 S toward I-80 E/Oakland/San Jose — 35.4 mi 4. Take exit 398B to merge onto CA-85 S toward Santa Cruz/Cupertino — 5.4 mi

612

5. Take the exit onto I-280 S toward San Jose — 2.7 mi

6. Take exit 10 for Wolfe Rd — 0.2 mi

622 — 7. Take right at N Wolfe Rd, near BJ's restaurant — 0.4 mi

8. Continue past 76 station, if you reach Mike's house, you've gone too far — 0.9 mi 9. Turn left after In-N-Out Burger Destination will be on the right — 0.2 mi — 628

(B) Safeway
6150 Bollinger Road
San Jose, CA 95129

|  | POI 1 | POI 2 | POI 3 | ••• | POI N |
|---|---|---|---|---|---|
| Name | Street light2 | In-N-Out | Gas Station | ••• | Joe's house |
| Location | address 1 | address 2 | address 3 | ••• | address n |
| Visibility - day | .4 | .7 | .7 | ••• | .4 |
| Visibility - night | .2 | .8 | .9 | ••• | .4 |
| Contact address? | No | Yes | No | ••• | Yes |
| Past destination | No | No | Yes | ••• | Yes |
| Past reference? | Yes | Yes | No | ••• | No |
| Past success rate | 58% | 89% | 88% | ••• | 95% |

FIG. 7

POINT OF INTEREST BASED DIRECTIONS IN A MAPPING APPLICATION

BACKGROUND OF THE INVENTION

This is directed to systems and methods for providing directions to a destination as part of a mapping application. In particular, this is directed to providing directions based on points of interests, where the particular points of interest are selected based on their visibility to users.

With the increase in access to GPS satellites, many devices for tracking a user's position and providing directions to various destinations have been manufactured and sold. In particular, GPS-specific devices, as well as devices having other primary purposes but to which GPS circuitry has been added (e.g., mobile phones) have been developed. To provide a useful user experience, the devices access accurate maps of a user's surroundings, and plot the detected current location of the user on the maps. As the device position changes, the detected location displayed on the map can change.

In some cases, a user can direct a GPS-enabled device to provide a path or directions from a user's initial location or position to a destination. The directions can be provided for a particular mode of transportation, such as by foot, bicycle, or car. In particular, the directions can correspond to roads or paths of the map of the user's surroundings. Some devices can include a visual user interface for displaying the particular path to be followed by the user. For example, the device can display a map having a path describing the route to be followed to the destination. These approaches, however, may be difficult for a user to follow when the particular street names are difficult to read, or when the user has difficulty measuring distance to the turns.

SUMMARY OF THE INVENTION

This is directed to systems and methods for providing directions to a destination based on easily identifiable points of interest. In addition, this is directed to identifying the particular points of interest to use for providing directions to the destination.

An electronic device can provide a route from a starting point to a destination, where the route includes several steps for a user to follow. Each step can include an instruction for the user to follow, as well as a reference around which to perform the instruction. The instruction can include, for example, an instruction to turn, continue, exit, bear to the side, or variations of these. To ensure that the step is easy to follow, the reference can include one or more points of interest having a high visibility (e.g., more visible than a street sign).

The particular one or more points of interest selected as a reference for a step can be selected based on any suitable criteria. For example, each point of interest can be associated with several visibility attributes stored in an appropriate data structure. The visibility attributes can be used as inputs in a formula or equation to define a visibility quantity for each point of interest. In some cases, the visibility quantity can be defined relative to a particular step, or relative to a particular location at which an instruction is to be followed. In particular, the visibility quantity can depend on the distance between the location of the step and the point of interest, or on the line of sight between the point of interest and the location. In some cases, a point of interest can be used as an indication that a user has gone to far and gone off the route.

A particular step can include any suitable number of instructions and references. For example, a step can include several instructions and references based on points of interest, as well as an instruction and a reference based on a street name. The device can decide which points of interest to use using any suitable approach, such as comparing a visibility quantity of each point of interest with a threshold value (e.g., associated with a street sign). If several points of interest have visibility quantities that exceed the threshold value, one or more of the several points of interest can be used. As another example, points of interest can be selected based on historical data from prior routes followed by other users. In particular, a route can use points of interest that were used in other routes that users followed successfully, while points of interest used in routes that users were unable to follow may be ignored.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 6 is a schematic view of an illustrative display of directions based on points of interest in accordance with one embodiment of the invention;

FIG. 7 is an illustrative data structure for quantifying the usefulness of points of interest for a mapping application in accordance with one embodiment of the invention;

DETAILED DESCRIPTION

This is directed to systems and methods for providing directions using a mapping application based on points of interest. In particular, this is directed to identifying the locations for turns using points of interest that a user can easily identify when following the directions.

In some embodiments, an electronic device can include positioning circuitry for identifying the current location of the device. The positioning circuitry can identify the location of the device using any suitable approach, including for example a GPS-based system, cellular tower triangulation-based system, communications network node position-based system, or combinations of these. The device can include or access one or more maps having different points of interest or destinations to which a user may desire to go. When a user wishes to go to a particular destination, the user can identify the destination to the device (e.g., using the maps) using an appropriate input interface. Based on the user's current location, as determined by the positioning circuitry of the device, the device can determine one or more routes from the current location to the user selected destination.

The identified route can include one or more turns to follow different roads to the destination. The turns can be identified using different approaches, including for example street names. In some embodiments, however, turns can instead or in addition be identified relative to points of interest that may be easy for a user to see as the user follows the route. For example, turns can be identified based on large buildings, stores, or landmarks that stand out. As another example, turns can be identified based on points of interest or destinations that are known to the user (e.g., a destination that the user previously reached).

To ensure that the user will recognize the route, the electronic device can select from several available points of interest identifying each turn, or can specify several points of interest each identifying the same turn. The electronic device can select the points of interest used based on any suitable criteria, such as for example visibility of the point of interest, user's knowledge of the point of interest, past performance using the point of interest (e.g., whether users recognized the point of interest and made the required turn on past routes), the size of the point of interest, or combinations of these.

Figure 1:
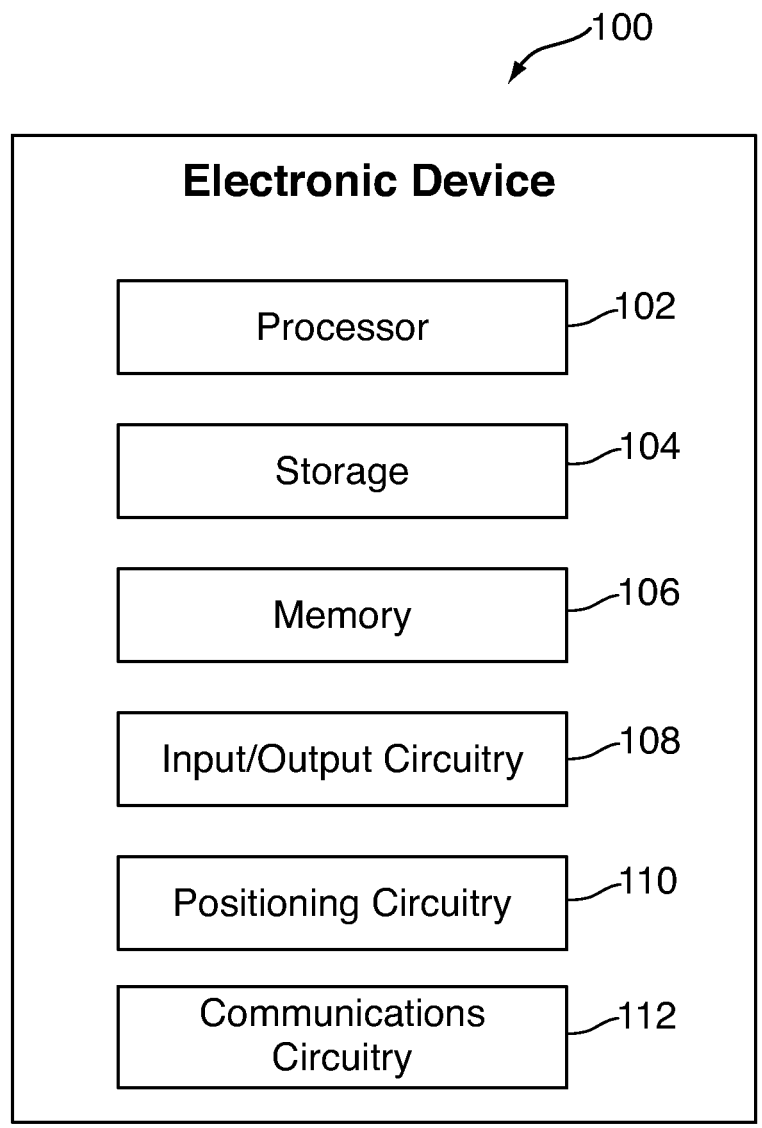
FIG. 1 is a schematic view of an illustrative electronic device for providing a mapping application in accordance with one embodiment of the invention.

FIG. 1 is a schematic view of an illustrative electronic device for providing a mapping application in accordance with one embodiment of the invention. Electronic device 100 can include any suitable type of electronic device operative to provide a route from a starting point to a destination. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a desktop computer, a music recorder, a video recorder, a camera, radios, medical equipment, and any other device capable of displaying a route to a destination. In some embodiments, the device may receive a route computed or defined by a remote device or server, and simply display the route.

Electronic device 100 can include a processor or control circuitry 102, storage 104, memory 106, input/output circuitry 108, positioning circuitry 110, and communications circuitry 112, as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106, or remove positioning circuitry 110), or electronic device 100 can include other components not combined or included in those shown in FIG. 1 (e.g., motion detection circuitry), or several instances of the components shown in FIG. 1. For the sake of simplicity, only one of each of the components is shown in FIG. 1.

Processor 102 may include any processing circuitry operative to control the operations and performance of electronic device 100. For example, processor 102 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media, application data, firmware, user preference information authentication information, lifestyle, exercise, transaction, wireless connection, subscription, contact, or calendar information, and any other suitable data or any combination thereof. Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input/output circuitry 108 can convert (and encode/decode, if necessary) analog signals and other signals into digital data. For example, input/output circuitry 108 may receive and convert physical contact inputs (e.g., from a multi-touch screen or a button press), physical movements (e.g., from a mouse or sensor), analog audio signals (e.g., from a microphone), or any other input provided by a user. Although input/output circuitry 108 is illustrated in FIG. 1 as a single component of electronic device 100, several instances of input/output circuitry can be included in electronic device 100.

Electronic device 100 can include any suitable mechanism, interface or component for allowing a user to provide inputs to input/output circuitry 108. For example, electronic device 100 may include a button, keypad, dial, a click wheel, or a touch interface (e.g., a capacitive touch screen), or combination of these. Electronic device 100 can include specialized output circuitry associated with output signals such as, for example, one or more audio or visual outputs. An audio output may include one or more speakers (e.g., mono or stereo speakers) built into electronic device 100, or an audio component that is remotely coupled to electronic device 100 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronics device 100, a movable display or a projecting system for providing a display of content on a surface remote from electronic device 100 (e.g., a video projector), or combinations of these. In some embodiments, input/output circuitry 108 can include a coder/decoder (Codec) to convert digital media data into analog signals such as, for example, video Codecs, audio Codecs, or any other suitable type of Codec.

Positioning circuitry 110 can determine the current position of the electronic device, and can be operative to update the current position at any suitable rate, including at relatively high rates to provide an estimation of speed and distance traveled. In some embodiments, the positioning circuitry can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. As another example, a radio frequency ("RF") triangulation detector or sensor integrated with or connected to the electronic device can determine the approximate location of the device. The device's approximate location can be determined based on various measurements of the device's own network signal, such as: (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) can also be used to determine the current position of electronic device 100. Instead or in addition, the positioning circuitry of the device can the location of the device based on a wireless network or access point that is in range or a wireless network or access point to which the device is currently connected. For example, because wireless networks have a finite range, a network that is in range of the device can indicate that the device is located in the approximate geographic location of the wireless network. In some embodiments, the device can automatically connect to a wireless network that is in range in order to receive the valid modes of operation for that location.

Communications circuitry 112 can enable electronic device 100 to communicate with other devices or with one or more servers using any suitable communications protocol. Electronic device 100 can include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 112 may include one or more communications ports operative to provide a wired communications link between electronic device 100 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 100 may include a bus operative to provide a data transfer path for transferring data to, from, or between control processor 102, storage 104, memory 106, input/output circuitry 108, positioning circuitry 110, communications circuitry 112, and any other component included in the electronic device.

The electronic device can include a mapping application for providing a graphical representation of an environment. For example, the mapping application can provide graphical map of the area in the vicinity of the user. As another example, the mapping application can provide a graphical map of an area of interest to the user. In some cases, the user may wish to identify particular points of interest in a geographic location. For example, the electronic device can display a map representing the location of the user, on which pins or other indicators can be positioned to indicate points of interest, the user's current location, locations saved or bookmarked by the user, or any other suitable location. The displayed graphical map can include any suitable representation of the environment. For example, the map can include a schematic representation of a location (e.g., drawn roads), photographic representations (e.g., satellite views or street views), combinations of these, or any other suitable representation of the user's location.

Figure 2:
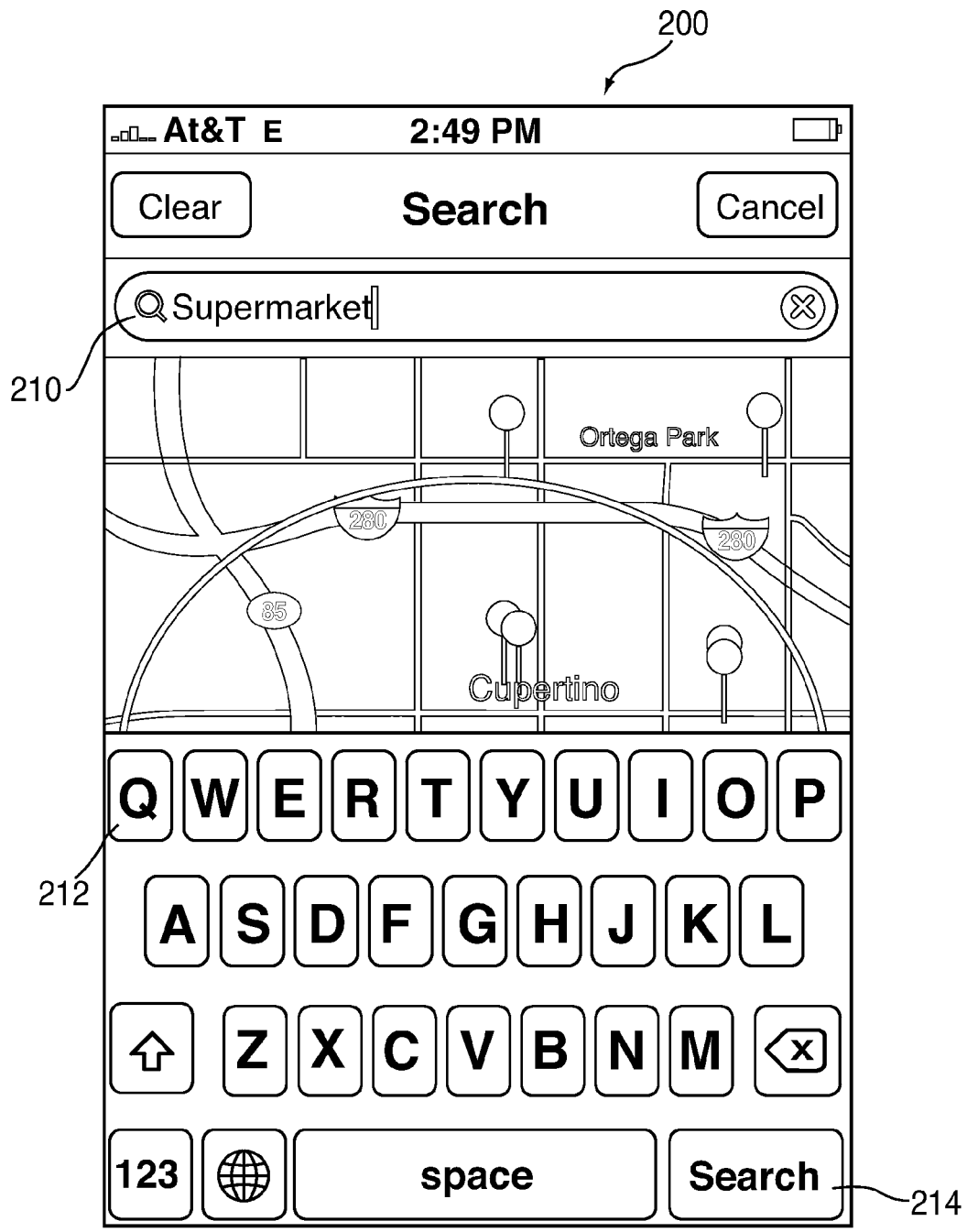
FIG. 2 is a schematic view of an illustrative display for searching for points of interest in a mapping application in accordance with one embodiment of the invention.

Using the mapping application, a user can direct the electronic device to identify the location of points of interest to the user. The user can identify particular points of interest for which to search using any suitable approach, including for example via a search bar into which the user can enter search terms. FIG. 2 is a schematic view of an illustrative display for searching for points of interest in a mapping application in accordance with one embodiment of the invention. Display 200 can include search field 210 in which the user can enter search terms for points of interest, for example using keyboard 212. Once the user has entered appropriate search terms, the user can direct the device to search for points of interest matching the search terms using a "search" option, such as option 214.

Figure 3:
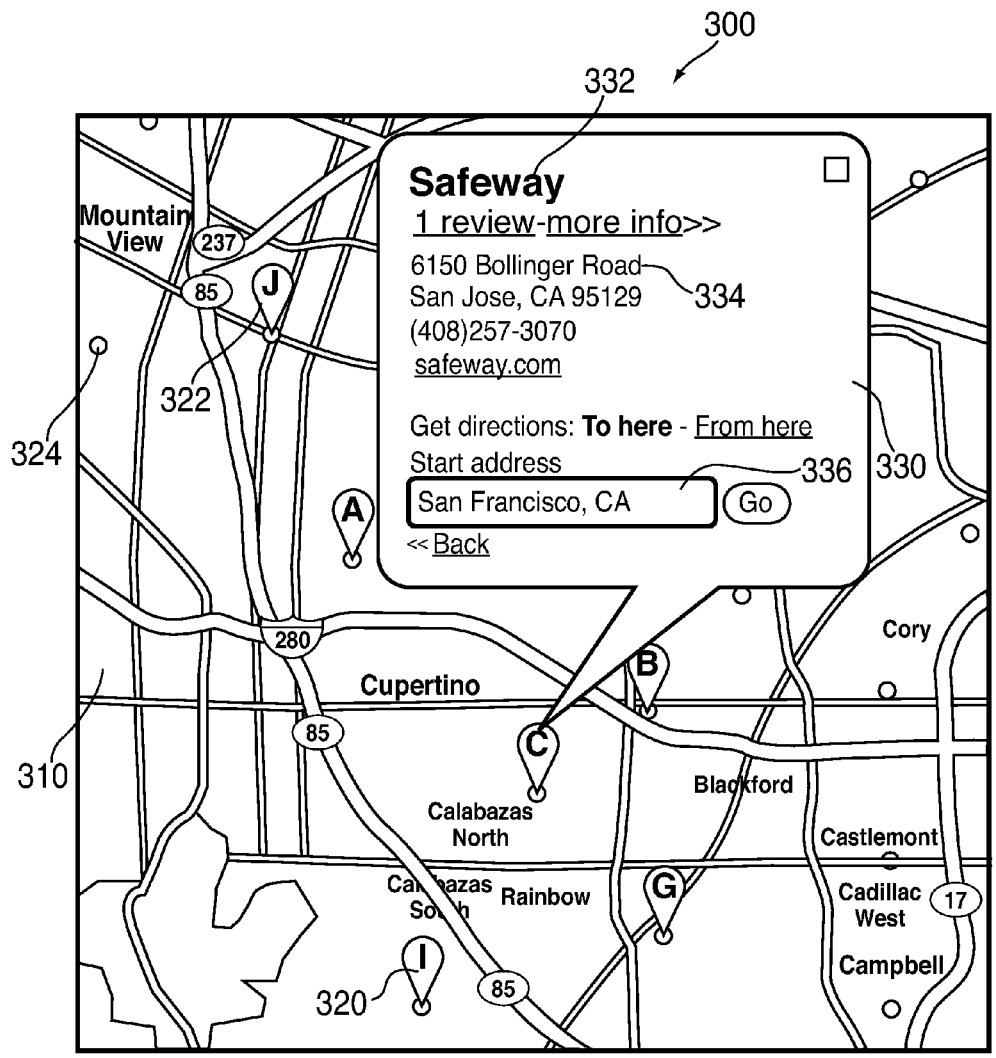
FIG. 3 is a schematic view of an illustrative display of search results in a mapping application in accordance with one embodiment of the invention.

In response to receiving a search instruction, the electronic device can search for a listing of points of interest that match the search terms and that are located within a particular geographic region (e.g., the region displayed when the search was performed). If the points of interest and map are locally stored on the device, the device itself can perform the search. Alternatively, the device can connect to a remote source (e.g., a remote server) to request the search, and display results provided by the server. FIG. 3 is a schematic view of an illustrative display of search results in a mapping application in accordance with one embodiment of the invention. Display 300 can include map 310 on which representations 320 can be provided to indicate the location of points of interest matching the entered search terms. Representations 320 can take any suitable form, including for example pins 322 and dots 324. A user can select a particular representation 320 to view more information about the point of interest. The electronic device can display the additional information using any suitable approach, including for example in a new window or display, as an overlap (e.g., a pop-up overlay), or combinations of these. In the example of FIG. 3, display 300 can include overlay 330 that includes the name of the point of interest 332, the address and other contact information 334.

The user can direct the electronic device to provide directions to or from a particular point of interest using any suitable approach. In some embodiments, overlay 334 can include directions option 336 in which the user can define a start or ending location from which to which to define a path. The user can enter any suitable start or ending location, including for example a particular address, city name, point of interest, or combination of these. In response to receiving a request for directions, the electronic device can determine one or more paths from the start location to the ending location. The electronic device can determine the paths using any suitable approach. In one implementation, the electronic device can include or have access to an algorithm for determining paths between two locations, as well as mapping information (e.g., data related to roads, such as the points each road connects, and the time required for traveling on each road). Using the algorithm, the electronic device can determine one or more paths between the locations. In another implementation, the electronic device may not include or have direct access to the algorithm for determining the paths, or to the mapping information required for determining the paths. In such cases, the electronic device can instead or in addition provide the start and ending locations, as well as other conditions for the path (e.g., way points, traffic considerations, or multi-stop routes) to a remote source that has access to the required algorithm and mapping information. For example, the electronic device can provide a route request to a web server or remote service (e.g., using a communications path supported by the device communications circuitry), and receive directions for one or more paths or routes from the remote source.

Figure 4:
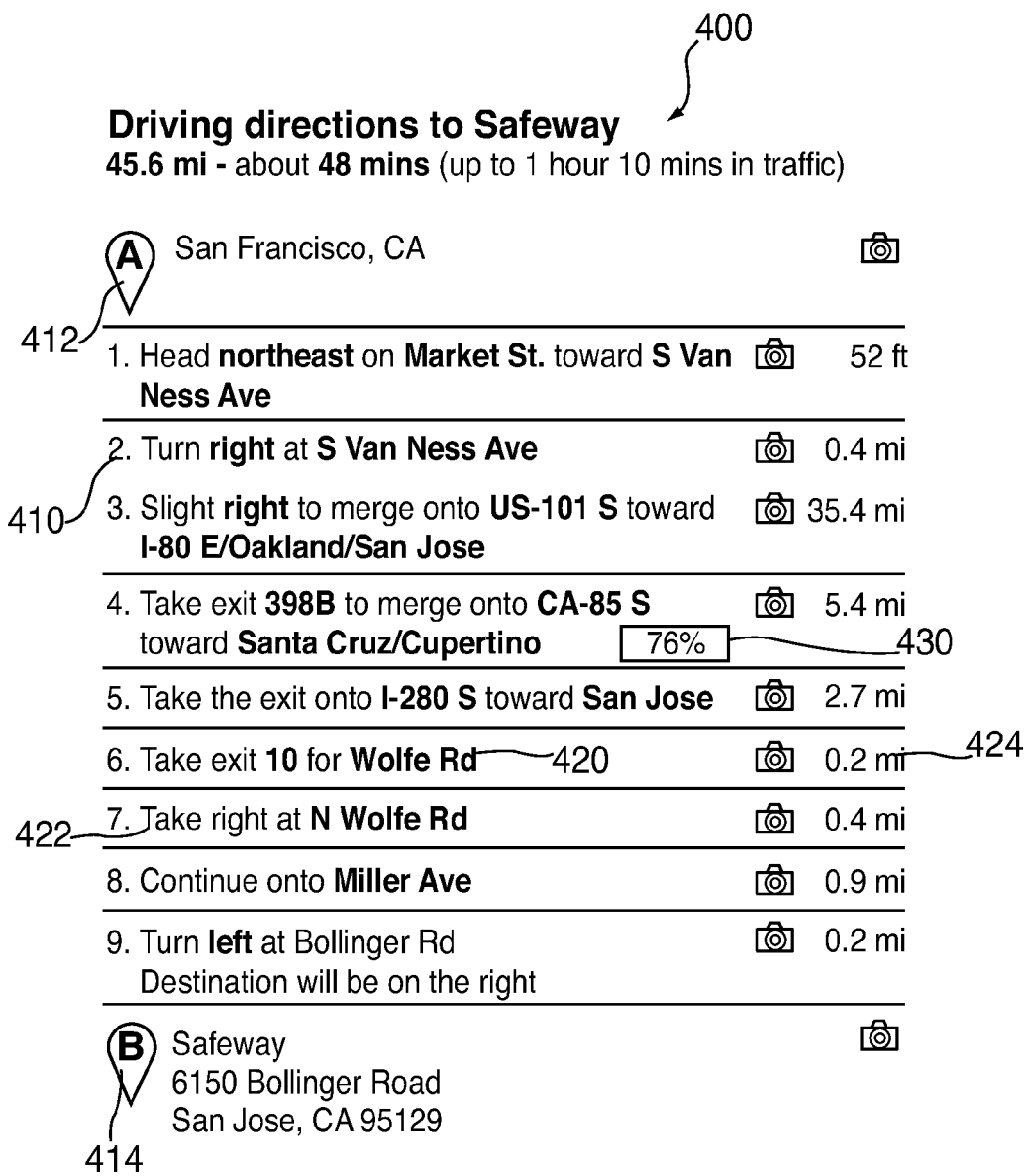
FIG. 4 is a schematic view of an illustrative display of route directions in accordance with one embodiment of the invention.

The electronic device can provide the directions to the user using any suitable approach. In some embodiments, the electronic device can provide a list of roads and turns to follow to reach the desired destination. FIG. 4 is a schematic view of an illustrative display of route directions in accordance with one embodiment of the invention. Display 400 can include listing 410 of individual steps for a user to follow to reach destination 414 from starting location 412. Each step can be identified by a road name 420, an instruction on how to reach the road from the previous step 422 (e.g., turn right or continue), and a distance indication 424. As the user travels on the path, the electronic device can detect the user's current position and highlight the current step of the directions (if the device has positioning circuitry capable of determining the device location). For example, display 400 can provide indicator 430 identifying the current step and indicating the user's progress within the step (e.g., 76% complete). This can assist the user in identifying the upcoming step to follow. If the user misses a step, the electronic device can revise the directions to redirect the user to the destination (e.g. provided the device can identify the current location of the user and determine that it does not match a step of the route).

Figure 5:
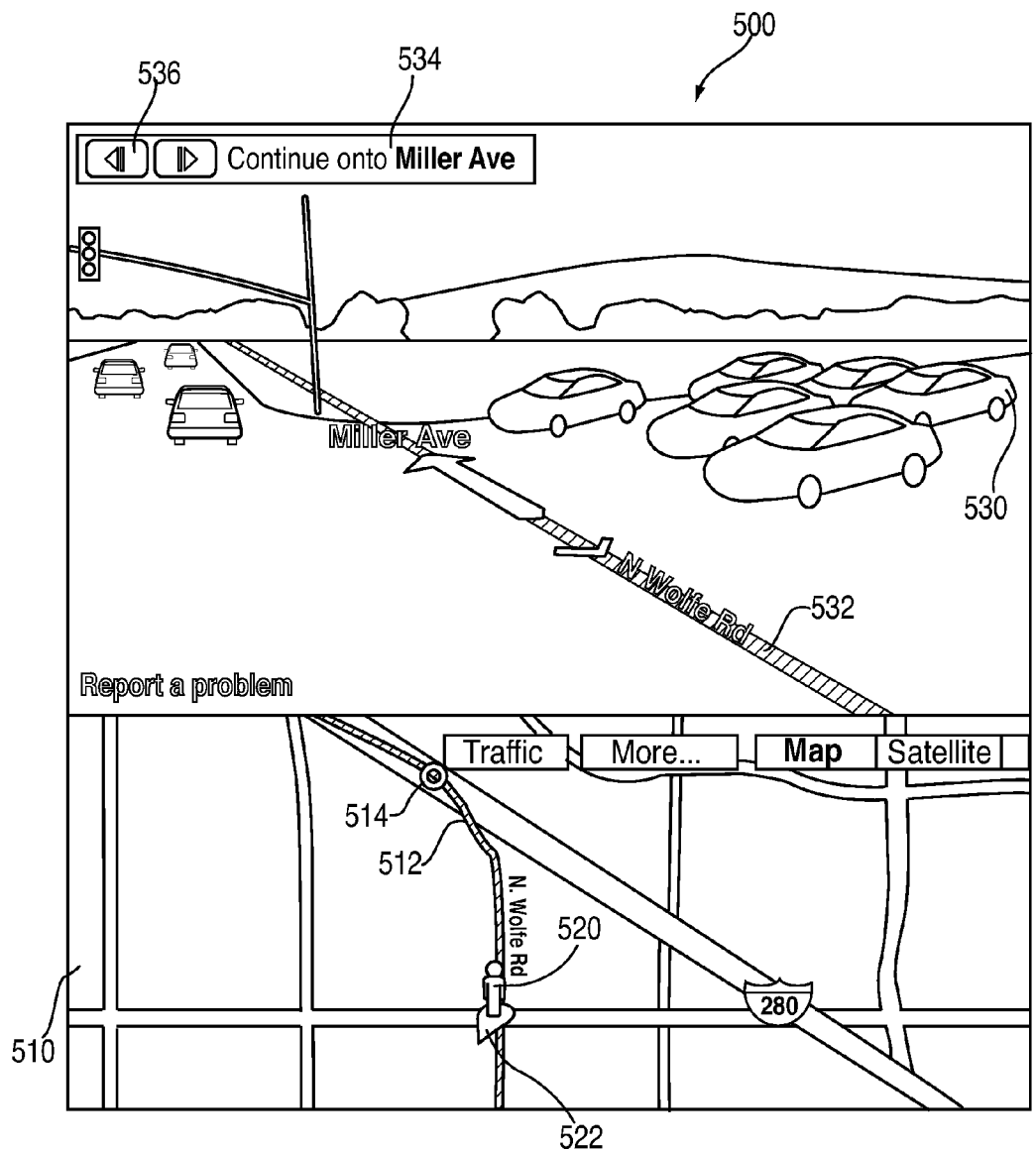
FIG. 5 is a schematic view of an illustrative display showing a user's route on a map in accordance with one embodiment of the invention.

In some embodiments, the electronic device can provide a graphical representation of the user's route on a map display. FIG. 5 is a schematic view of an illustrative display showing a user's route on a map in accordance with one embodiment of the invention. Display 500 can include map representation 510 showing roads and other landmarks. Display 500 can include the user's path 512 overlaid over map representation 510. If the device has the ability to determine the current location of the user, display 500 can include indicator 514 representing the current position of the device.

To further enhance a user's ability to follow the provided path, display 500 can provide image 530 representing the actual appearance of the user's route. Image 530 can correspond to any portion of the user's route. In some embodiments, image 530 can correspond to the current position of the device (e.g., the position of indicator 514). This approach may enable the user to compare, in real time, the actual surroundings of the user with those of image 530 to ensure that the user is following the directions correctly. In some embodiments, image 530 can correspond to an upcoming turn or step in the directions (e.g., the next step). This approach can indicate to the user what to look for to ensure that the user does not miss the following step.

In some cases, the user can instead or in addition direct the electronic device to provide an image 530 for a user selected portion of the route. In the example of FIG. 5, image 530 can correspond to the perspective of a person at location 520 looking in the direction of arrow 522. The user can change location 520 or direction 522 to modify the image 530 displayed. In some embodiments, image 530 can include path overlay 532 indicating the path to be followed by the user to follow the directions. The electronic device can display description 534 corresponding to the displayed step, along with navigation bar 536 for providing context to image 530.

While the information provided in displays 400 and 500 can be useful to assist a user in following directions, there may be times when the particular information provided by those displays may be less useful. For example, a user may be driving by areas where no images of the surroundings (e.g., image 530, FIG. 5) exist. As another example, the user can be driving when there is low light and street signs are not visible. As an alternative to these approaches, the electronic device can provide alternate reference points for each step in the directions. FIG. 6 is a schematic view of an illustrative display of directions based on points of interest in accordance with one embodiment of the invention. Similar to display 400 (FIG. 4), display 600 can include listing 610 of steps 612 to follow to get from starting location 614 to destination 616. Instead of defining directions and turn locations by street names, however, the display can instead or in addition identify the directions or turn locations based on points of interest. In particular, each step 612 can include a direction instruction 622 (e.g., start, continue, exit or turn) and a reference 624 at which to perform the direction instruction, where reference 624 includes street names, points of interest, or both.

Any suitable information can be provided as reference 624 for guiding a user along the identified path, including for example any suitable point of interest. For example, reference 624 can include a street name, or a description of particular building or business type (e.g., a gas station). As another example, reference 624 can include a particular business (e.g., In-N-Out), or a previous destination to which the user requested directions (e.g., 76 gas station). As still another example, reference 624 can include an address from a user's contacts (e.g., Mike's house). Each reference 624 can include one or more different elements or types of references. For example, reference 626 can include a street name and information identifying a particular street light (e.g., the first light). As another example, reference 628 can include a particular business name (e.g., 76 gas station) and a contact's address (e.g., Mike's house). In some embodiments, a particular reference can be qualified as a boundary for a step. For example, in reference 628, the step indicates that if the user reaches a particular landmark or known location (e.g., a friend's house), the user has gone to far and strayed off the route.

The electronic device can select any suitable point of interest or combination of points of interest for display as a reference. In particular, the electronic device can use any suitable criteria for determining which points of interest to use at each step. In some embodiments, the electronic device can select points of interest based on their location relative to instruction locations (e.g., where the route turns). For example, the electronic device can select points of interest that are at least within a minimum distance from a turn location. In some embodiments, the electronic device can apply a value to each point of interest based on its distance to the turn location. For example, the electronic device can define a geographic region around a location of a step, and search for points of interest within the geographic region (or beyond the geographic region to indicate to a user that he has gone too far). The boundaries of the geographic region can be defined based on any suitable criteria such as, for example, the entrance and exit points of the route in the region, the distance between the step of the region and other steps of the route, the manner in which the path goes through the region, or combinations of these. In some cases, the region can be defined by a varying distance from the location of the step (e.g., varying based on the cardinal direction from the location).

The electronic device can in addition or instead review the size or visibility of each point of interest. In some cases, the size or visibility of a point of interest can change, for example based on a season or time of day. To illustrate, a large building is very visible during the day, but not at night due to limited lights, while a restaurant at a distance from the route may not be visible during the day, but visible at night when a large sign raised over the restaurant is lit. The electronic device can assess a value to each point of interest based on its visibility, and combine the location and visibility values of each point of interest to determine the one or more most appropriate points of interest to select for identifying the route to the user.

In some cases, other criteria can be used instead or in addition to identify points of interest to use. In some embodiments, the electronic device can identify points of interest that are known to the user. For example, the electronic device can identify and assess a high value to previous destinations for which the user requested a route, or to which the user went. As another example, the electronic device can identify home or work addresses of the user's contacts (e.g., stored by the user in the device, or accessible to the device from a remote address book).

In some embodiments, the electronic device can monitor the routes and destinations that the user or other users have followed in the past. The electronic device can propose routes in which the directions are provided using different points of interests as references, and monitor the success rate for users to stay on the path for each set of directions. The electronic device can then analyze the success rates to determine which points of interest were easily identified and followed when part of directions, and which points of interest were less easily identified and led to more incorrect travel (e.g., missing a turn of the directions). Based on the success rate of each point of interest, the electronic device can increase or decrease a value associated with the points of interest.

The electronic device can store data reflecting the effectiveness or attributes of each point of interest using any suitable approach. In some embodiments, portions of the data can be universal (e.g., applicable to every user of the mapping service), while other portions of the data can be customized or tailored for specific users. FIG. 7 is an illustrative data structure for quantifying the usefulness of points of interest for a mapping application in accordance with one embodiment of the invention. Data structure 700 can include a table of points of interest and related metadata that can be used to determine the effectiveness of the points of interest as reference points for providing directions. Data structure 700 can include rows 702 of point of interest attributes and values and columns 704 of points of interest. For example, data structure 700 can include columns 721, 722, 723 and 724 for points of interest 1, 2, 3 and up to N. Each of the points of interest can be identified by a name in row 712. In row 713, each point of interest can include location information. The location information can be provided in any suitable formal such as, for example, GPS or other positioning standard coordinates, an address, referencing information relative to other points of interest, or combinations of these.

In row 714, each point of interest can be associated with a value describing the visibility of the point of interest during the day, and in row 715 the visibility at night. In some cases, the visibility value can be variable and include a variable for the time of day (e.g., an equation into which the time of day can be input to receive a visibility value). The visibility value can include any suitable quantifiable quantity, such as a number in the range of 0 to 1 or 0 to 100. Row 716 can include a Boolean value indicating whether the point of interest corresponds to an address of a contact known to the user (e.g., an address from the user's address book). In some cases, row 716 can instead or in addition include a value reflecting the user's familiarity with the contact or with the address (e.g., addresses of family or work may have higher values than addresses of business contacts or other friends).

Rows 717 and 718 can include Boolean values indicating whether the point of interest was a past destination of the user, or whether the point of interest was previously used as a reference in direction provided to the user, respectively. In some cases, rows 717 and 718 can instead or in addition include quantifiable values reflecting the user's familiarity with the point of interest. For example, a destination that a user visited once and a long time ago may have a lower value than a regular destination of the user's. As another example, a point of interest used as a reference in several routes followed by the user can have a higher value than a point of interest rarely used by the user. In some embodiments, data structure 700 can instead or in addition include information regarding points of interest that the user has seen in the past (e.g., that the user has driven by, even though they were not references for turns as the directions did not require a turn by the point of interest), as well as other information describing the past or historic displacement of the user.

Row 719 can include information regarding the success rate of particular points of interest when used as references for directions followed by the user or other users of different electronic devices. For example, row 719 can include a rate of recognition for each point of interest based on the number of users that adequately followed the route when directed to change directions based on the point of interest. The value of row 719 can be provided using any suitable approach, including for example as a rate (e.g., a percentage).

Using the information of data structure 700, the electronic device (or other route-defining service) can calculate a usefulness or effectiveness of each point of interest (e.g., as a numerical value). The electronic device can compare the calculated usefulness or effectiveness to that of street names (e.g., a default or standard numerical value), and based on the comparison provide one or both of the point of interest and the street name. In some cases, several points of interest can be provided instead of or in addition to the street name (e.g., if several points of interest have a higher value than the street name or default value). In some cases, the electronic device can provide geographic clues describing the location of a point of interest relative to the route or path as part of the directions (e.g., turn left two lights after you pass Joe's house on your right).

Figure 8:
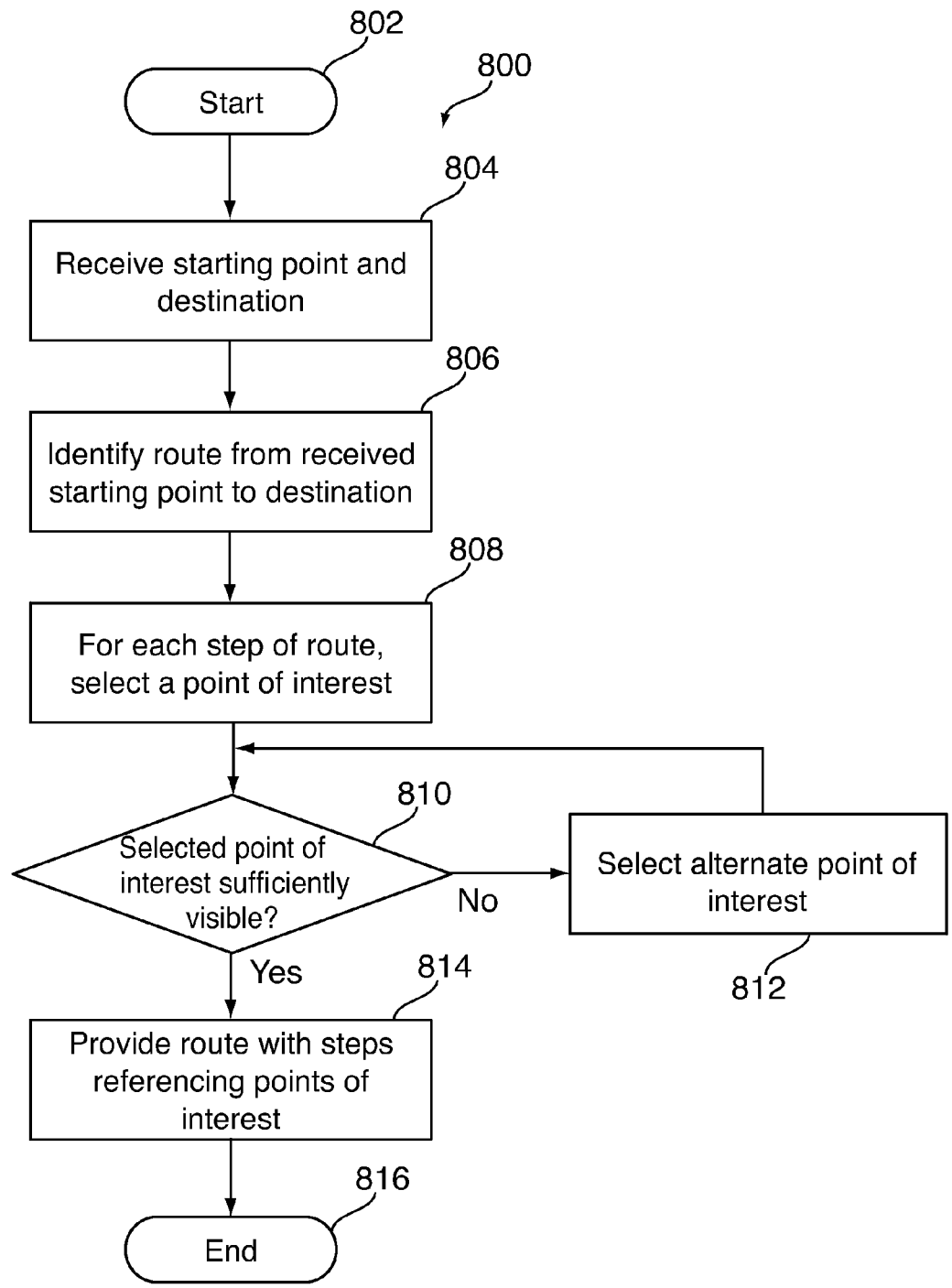
FIG. 8 is a flowchart of an illustrative process for defining directions based on appropriate points of interest in accordance with one embodiment of the invention.

The following flow charts describe illustrative processes used to provide directions based on references other than street names. FIG. 8 is a flowchart of an illustrative process for defining directions based on appropriate points of interest in accordance with one embodiment of the invention. Process 800 can begin at step 802. At step 804, the electronic device can receive a starting point and destination. For example, a user can provide an input corresponding to a starting point and destination. As another example, a remote source determining the preferred route or path between two locations can receive the starting point and destination from an electronic device. At step 806, the electronic device (or remote source) can identify a route between the starting location and the destination. For example, the electronic device (or the remote source) can identify a path, following existing roads, that most efficiently leads between the starting location and the destination.

At step 808, the electronic device (or remote source) can select a point of interest for each step of the route. The selected point of interest can be selected to be visible to a user at the beginning or end of a step, so that the user knows where to go. In particular, the point of interest can be selected to serve as a reference around which to direct the user along the route (e.g., direct the user to turn, exit or continue). In some cases, the point of interest can be selected instead of or in addition to a street name. At step 810, the electronic device (or remote source) can determine whether each selected point of interest is sufficiently visible for the directions. For example, the electronic device can determine a visibility value for the point of interest at the particular step, and determine whether the visibility value exceeds a minimum threshold (e.g., a threshold corresponding to the visibility of a street name sign). If the electronic device determines that a point of interest is not sufficiently visible, process 800 can move to step 812. At step 812, the electronic device can select an alternative point of interest for a step. For example, the electronic device can select another point of interest that may be better adapted for the particular step of the route. In some cases, there may be no point of interest better adapted than a street name. Process 800 can then return to step 810 and determine whether the alternate point of interest is sufficiently visible.

If, at step 810, the electronic device (or remote source) instead determines that the selected points of interest are sufficiently visible, process 800 can move to step 816. At step 816, the electronic device can provide a route with steps referencing the points of interest to a user. For example, the electronic device can provide a series of steps defining the route, where each step includes a direction and a reference (e.g., a point of interest) around which to go in the identified direction (e.g., turn right before In-N-Out Burger restaurant). Process 800 can then end at step 816.

Figure 9:
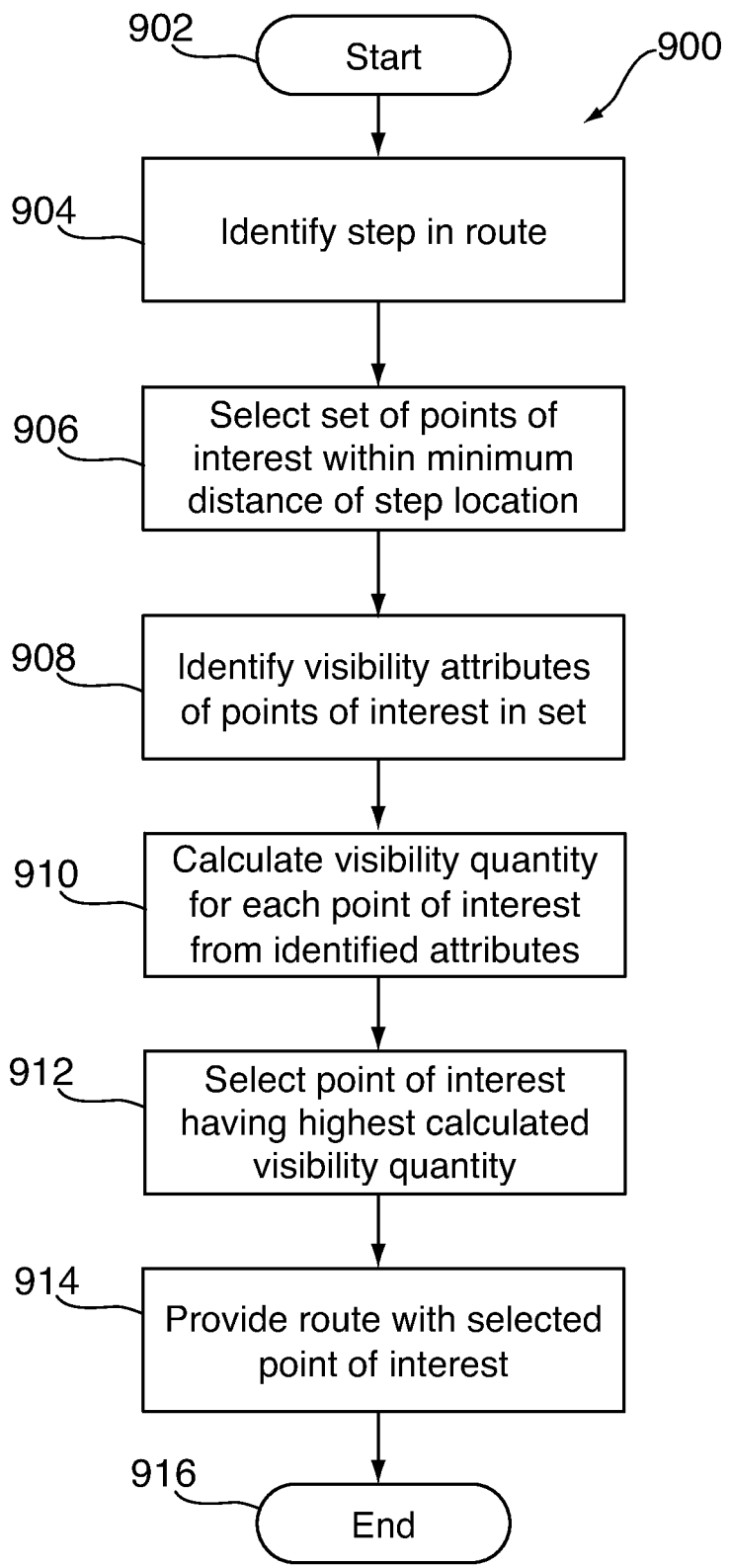
FIG. 9 is a flowchart of an illustrative process for selecting a particular point of interest to identify a step in a route in accordance with one embodiment of the invention.

FIG. 9 is a flowchart of an illustrative process for selecting a particular point of interest to identify a step in a route in accordance with one embodiment of the invention. Process 900 can begin at step 902. Although the steps of the following process will be described in the context of the electronic device, it will be understood that any suitable device, such as a remote source can perform the steps of the process. At step 904, the electronic device can identify a step in a route. For example, the electronic device can identify each step in a route from a starting point to a destination (e.g., received using an input interface of the device). At step 906, the electronic device, the electronic device can select a set of points of interest that are within a minimum distance of a step. For example, the electronic device can select a set of points of interest within 200 yards of a corner or intersection at which the directions call for a change in direction or a modification to the road. Any suitable minimum distance can be used for a step, such as 500 yards, 200 yards, 100 yards, 50 yards, or any other suitable distance. The minimum distance can be distributed in any suitable manner relative to a step location. For example, the minimum direction can vary in different directions relative to the step location (e.g., longer minimum direction before reaching the step, shorter minimum direction after the step).

At step 908, the electronic device can identify visibility attributes for the points of interest in the selected set. For example, the electronic device can retrieve from a data structure a series of quantified visibility attributes for each of the points of interest. Any suitable visibility attribute can be identified, including for example visibility at day or night, past destination use, past reference use, past success rate, or others. At step 910, the electronic device can calculate a visibility quantity for each point of interest from the identified attributes of the points of interest. For example, the electronic device can input the identified attributes in an equation or formula to output a quantifiable and comparable quantity expressing the visibility and usefulness of each of the points of interest for the step and route. At step 912, the electronic device can select the point of interest having the highest calculated visibility quantity. In some cases, the electronic device can instead or in addition select some or all of the points of interest for which the calculated visibility quantity exceeds a minimum threshold (e.g., the top three points of interest having a visibility quantity that exceeds the street sign visibility threshold). If several points of interest are selected, each point of interest can be qualified by a different instruction in the directions. For example, the direction can instruct the user to turn around a first point of interest, keeping a second point of interest always in front of them (e.g., or turning 200 yards after passing the second point of interest), and inform the user that he has gone too far and missed a turn if a third point of interest is reached. In some cases, no point of interest can be selected if a street sign is more visible than a point of interest.

At step 914, the electronic device can provide the route using the selected points of interest for each step. In some cases, a step can include several points of interest serving as references for a user. Alternatively, a step can include no points of interest, for example if the visibility quantity of all points of interest does not exceed a minimum threshold corresponding to the visibility of street signs. Process 900 can then end at step 916.

Although many of the embodiments of the present invention are described herein with respect to personal computing devices, it should be understood that the present invention is not limited to personal computing applications, but is generally applicable to other applications.

Embodiments of the invention can be preferably implemented by software, but can also be implemented in hardware, firmware, software or a combination thereof. Embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for providing directions to a destination, comprising:
   identifying a starting point and a destination;
   defining a route from the starting point to the destination, wherein the route comprises at least two steps, each step comprising an instruction and a reference;
   identifying a point of interest having a minimal visibility for a step, wherein identifying the point of interest includes comparing a visibility quantity associated with the point of interest with a minimum threshold; and
   using the identified point of interest as the reference for the step in response to determining that the visibility quantity associated with the point of interest exceeds the minimum threshold.

2. The method of claim 1, further comprising:
   for a step, identifying a location to which the instruction applies;
   defining a geographic region in the vicinity of the location that includes the location; and
   identifying a point of interest from the geographic region.

3. The method of claim 2, further comprising:
   determining the entrance point and exit point of the route in the geographic region; and adjusting the boundaries of the geographic region based on the determined entrance point and exit point.

4. The method of claim 3, wherein adjusting further comprises:
increasing the distance from the identified location to the entrance point.

5. The method of claim 3, wherein adjusting further comprises:
decreasing the distance from the identified location to the exit point.

6. The method of claim 2, further comprising:
identifying a boundary point of interest beyond the geographic region; and
indicating in the step that if the boundary point of interest is passed, the step was not followed.

7. The method of claim 1, further comprising:
determining that the visibility quantity is less than the minimum threshold; and
using a street name instead of the point of interest in response to determining that the visibility quantity is less than the minimum threshold.

8. The method of claim 1, wherein:
the instruction comprises at least one of an instruction to:
turn;
continue; exit; bear;
go towards; and
go in the direction of.

9. A method for selecting a point of interest for use in providing directions, comprising:
identifying a step in directions, wherein the step comprises an instruction and a reference;
identifying a location for the step;
defining a set of points of interest within a threshold distance of the identified location;
retrieving a set of visibility attributes associated with each of the points of interest;
calculating a visibility quantity for each of the points of interest of the defined set, wherein calculating the visibility quantity includes using the retrieved set of visibility attributes; and
selecting the point of interest having a calculated visibility quantity that exceeds a threshold value to be the reference of the step.

10. The method of claim 9, further comprising:
selecting a plurality of points of interest having visibility quantities that exceed the threshold to be a plurality of references for a single step.

11. The method of claim 10, wherein:
the plurality of references are each associated with different instructions.

12. The method of claim 10, further comprising:
ordering the plurality of points of interest based on the visibility quantities.

13. The method of claim 9, further comprising:
determining the distance between the step and a next step; and
defining the minimum distance based on the determined distance between the step and the next step.

14. The method of claim 9, wherein:
the minimum distance from the location varies based on the direction from the location.

15. A device for generating directions to a destination, comprising control circuitry operative to:
determine a route from a starting point to a destination, the route comprising a plurality of steps;
identify a location associated with a step;
identify a set of points of interest within a threshold distance of the location;
select a point of interest within the threshold distance of the location, wherein the point of interest has a visibility index that exceeds a particular threshold, wherein the selection is based on at least one of a visibility attribute of each of the points of interest in the set of points of interest and a distance of each of the points of interest in the set of points of interest from the location; and
incorporate the selected point of interest in the step.

16. The device of claim 15, further comprising communications circuitry, and wherein the control circuitry is further operative to:
direct the communications circuitry to provide the starting point and destination to a remote source; and
direct the communications circuitry to receive, from the remote source, the route between the starting point and the destination.

17. A non-transitory computer readable storage medium encoded with program instructions that, when executed, cause a processor in a computing device to execute a method for providing directions to a destination, the method comprising:
identifying a starting point and a destination;
defining a route from the starting point to the destination, wherein the route comprises at least two steps, each step comprising an instruction and a reference;
identifying a point of interest having a minimal visibility for a step, wherein identifying includes comparing a visibility quantity associated with the point of interest with a minimum threshold; and
using the identified point of interest as the reference for the step in response to determining that the visibility quantity associated with the point of interest exceeds the minimum threshold.

18. The computer readable storage medium of claim 17, wherein the method further comprises:
for a step, identifying a location to which the instruction applies;
defining a geographic region in the vicinity of the location that includes the location; and
identifying a point of interest from the geographic region.

\* \* \* \* \*